United States Patent [19]
Cutler

[11] 3,960,581
[45] June 1, 1976

[54] PROCESS FOR PRODUCING A SOLID SOLUTION OF ALUMINUM OXIDE IN SILICON NITRIDE

[75] Inventor: Ivan B. Cutler, Salt Lake City, Utah

[73] Assignee: The University of Utah, Salt Lake City, Utah

[22] Filed: Apr. 29, 1974

[21] Appl. No.: 465,222

[52] U.S. Cl. ............................... 106/65; 106/73.4; 106/73.5
[51] Int. Cl.² .......................................... C04D 35/58
[58] Field of Search .................... 106/65, 73.4, 73.5

[56] References Cited
UNITED STATES PATENTS

| | | | |
|---|---|---|---|
| 2,636,828 | 4/1953 | Nicholson | 106/65 |
| 3,262,761 | 7/1966 | Bechtold | 106/65 |
| 3,262,763 | 7/1966 | Bechtold | 106/65 |
| 3,305,372 | 2/1967 | Taylor | 106/65 |
| 3,837,871 | 9/1974 | Weaver | 106/65 |

Primary Examiner—J. Poer

[57] ABSTRACT

A method of producing a sinterable refractory material having a low coefficient of thermal expansion and comprising essentially a dispersion of aluminum oxide throughout a silicon nitride matrix, herein called SIALON. The process includes obtaining aluminum and silicon from generally readily available raw material sources.

4 Claims, No Drawings

PROCESS FOR PRODUCING A SOLID SOLUTION OF ALUMINUM OXIDE IN SILICON NITRIDE

BACKGROUND

1. Field of the Invention

The present invention relates to a novel process for producing an aluminum oxide dispersion throughout a silicon nitride matrix, generally believed to be a solid solution, the process including obtaining reactants from readily available sources of raw material.

SIALON is defined herein to mean an intimate dispersion of aluminum oxide throughout a silicon nitride matrix. It is generally believed that upon sintering the material becomes a solid solution of aluminum oxide in silicon nitride.

2. The Prior Art

It has been recently discovered that the crystal lattice of silicon nitride can accommodate other atoms, both metallic and non-metallic, in fairly large amounts. For example, recent work has shown that aluminum and oxygen can enter the silicon nitride lattice to give, upon sintering, what is believed to be a solid solution of aluminum oxide in the silicon nitride matrix. This material is commonly referred to as "SIALON". The letters which make up the term "SIALON" are the letters taken from the chemical abbreviation for the elements therein, that is, silicon, aluminum, oxygen and nitrogen. Recent publications which discuss some of the properties of SIALON are to be found in *Nature Physical Science*, K. H. Jack and W. I. Wilson, Vol. 238, p. 28, July 10, 1972; and *Nature*, Vol. 238, p. 128, July 21, 1972.

Importantly, it has been discovered that, although the coefficient of thermal expansion is very low for silicon nitride, the inclusion of certain quantities of aluminum oxide within the crystal lattice provides a refractory material with an even lower coefficient of thermal expansion. In addition to the desirable feature of a low coefficient of thermal expansion, SIALON is also known for its compatibility with molten metals, hardness, generally low coefficient of friction, and chemical stability including resistance to oxidation at temperatures up to at least 1200°C.

In addition to the foregoing desirable features as a ceramic material, SIALON also behaves as a ceramic and lends itself well to certain well-known fabrication techniques including, for example, slip casting, extrusion, and pressing to produce a prefered shape.

Accordingly, in view of the desirable characteristics of SIALON coupled with the relative ease of fabrication, an entirely new dimension has been opened for the use of SIALON in numerous high temperature and refractory environments including, for example, molten metal handling components such as continuous casting snorkles, sliding gates, nozzles and furnace and kiln furniture. Other hostile environment applications suitable for a refractory material such as SIALON include catalyst supports, seals on rotary engines, high temperature components in gas turbines, spark plug insulators, abrasives, and cutting tool inserts.

It is readily apparent, therefore, that with the recent discovery of the many desirable properties of SIALON a greatly increased demand will be placed for the production of this material. However, since silicon nitride is not found in nature and is relatively expensive to produce, there exists a need to produce SIALON from readily available raw material sources. An even further advancement would be to provide a process whereby the final product (an intimate dispersion of aluminum oxide and silicon nitride) is readily produced from the initial reactants without further grinding, mixing or otherwise mulling the products of the reaction. An even further advancement would be to provide a process for producing SIALON from raw materials which are conventionally considered to be solid waste products.

Such developments and features are embodied in the present invention.

BRIEF SUMMARY AND OBJECTS OF THE INVENTION

SIALON is produced from many readily available sources of silicon, aluminum, oxygen and nitrogen. Since carbon appears to play a role in the reaction, a carbon source is also provided. Importantly, the aluminum and silicon sources are intimately combined prior to reaction in order that the resulting product may be an intimate dispersion of aluminum oxide throughout the silicon nitride.

It has been found that SIALON can be produced from silicon and aluminum compounds and from selected naturally occurring inorganic sources rich in silica including certain clay types having an aluminum oxide and silicon dioxide content. It has also been found that SIALON can be produced from selected organic sources rich in silicon dioxide. Rice hulls have been found to be surprisingly effective since the ash of the oxidized rice hulls has a surprisingly high content of silicon dioxide.

Accordingly, it is a principal object of this invention to provide improvements in the process of producing SIALON.

It is another object of this invention to provide improvements in the process of producing a refractory material comprising essentially aluminum oxide dispersed in silicon nitride.

It is another object of this invention to produce a refractory material from readily available sources of raw materials which are sources of silicon, aluminum, oxygen, nitrogen and carbon.

It is an even still further object of this invention to provide a process for producing a refractory material wherein certain of the raw materials used in the process are conventionally deemed to be waste products.

These and other objects and features of the present invention will become more fully apparent from the following description and appended claims.

DETAILED DESCRIPTION OF THE PREFERRED EMBODIMENTS

SIALON is produced by a reaction involving silicon, aluminum, oxygen, nitrogen and carbon. Although carbon does not remain as an essential ingredient in the final product, it is currently believed that carbon interreacts with the silicon dioxide and nitrogen in the formation of silicon nitride. Uniquely, each of these elements, and, in certain instances, the carbon necessary to a portion of the reaction, are easily supplied from readily available sources of raw materials.

Selection of the sources for the aluminum and silicon reactants is influenced by the initial intimate contact between the reactants in order to produce SIALON having an intimate dispersion of aluminum oxide throughout the silicon nitride.

Silicon is most readily available from silicon compounds including inorganic sources as silicon dioxide. For example, clay having an aluminum oxide in conjunction with silicon dioxide may be used because of the extremely fine dispersion of aluminum and silicon throughout. Clays having a weight percent of 40% to 20% aluminum oxide and 46% to 70% silicon dioxide are preferred if the clay is to be the sole inorganic source of aluminum and silicon. An extremely fine dispersion of aluminum oxide and silicon dioxide may also be obtained by suitably precipitating aluminum oxide and silicon dioxide from a solution.

An organic source of silicon dioxide is readily available in rice hulls since rice hulls contain approximately 15% to 20% by weight crude ash which in turn consists of about 95% silica ($SiO_2$). Sources of aluminum suitable as a reactant in combination with the rice hulls include, among others, clays formed by the geologic decomposition of aluminum compounds, oxides and salts of aluminum as well as finely divided aluminum metal, the concentration of aluminum not exceeding 20% by weight.

An oxygen source is usually in the form of an oxide of one of the reactants, silicon and aluminum, especially in the above-described clays. Nitrogen is generally supplied from conventional sources of nitrogen, including by way of non-limiting examples, nitrogen gas and ammonia.

Carbon from any suitable source has been found useful in its intermediary role in the formation of silicon nitride from silicon dioxide.

Regardless of which compounds or raw materials are chosen at the source of the reactants, the selection of the composition of the reactants should be based upon the desired ratio of aluminum oxide dispersed in silicon nitride in the product. Preferably, it is desirable to have a final product having a composition by weight percent of 15% to 70% aluminum oxide and 85% to 30% silicon nitride. Accordingly, whichever reactants are chosen, a simple precalculation will be useful in assuring that the resulting product has aluminum oxide and silicon nitride within the above desirable ratio ranges.

During the reaction, carbon reacts with oxygen to form carbon monoxide as a by-product of the reaction. Accordingly, it is desirable to reduce the partial pressure of carbon monoxide to correspondingly accelerate the reaction rate. This can be done, for example, by flushing the reaction chamber with excess quantities of nitrogen.

The following non-limiting examples are included herein to demonstrate the utility of the present invention and some of the possible techniques that may be employed by one of ordinary skill in the art in practicing the present invention.

EXAMPLE 1

A silicon dioxide source was acquired by obtaining a quantity of rice hulls. An aluminum source was intimately contacted with the silicon dioxide by dissolving an aluminum salt and absorbing the solution with the rice hulls. For example, a 50–50 mixture of aluminum oxide and silicon dioxide was obtained by dissolving 221.5 grams of aluminum chloride ($AlCl_3 \cdot 6H_2O$) in 352.75 milliliters of water and thereafter absorbing this solution with 166 grams of ground rice hulls. The rice hulls were thereafter dried and coked by conventional techniques at 400°C for one hour. Coking is not considered to be a required step in the practice of this invention but is generally preferred since coking reduces the volume of the reactants and also liberates certain useful by-products which may be recovered, if desired.

The coked mixture was subjected to a nitriding step by being heated to 1400°C for four hours in an enclosed reaction chamber, the reaction chamber being enclosed to facilitate control of the atmosphere of the reaction mixture. Nitrogen gas was introduced through the chamber at a flow rate of 6 liters per minute assuring an excess of nitrogen to flush the carbon monoxide from the reaction chamber and thus lower the partial pressure of the carbon monoxide.

This nitriding step was followed by removal of carbon and unreacted silicon dioxide. Carbon was removed by burning in air at 800° for two hours. Silicon dioxide was removed from the SIALON by dissolving in a 20% sodium hydroxide solution.

The amounts of carbon and silicon dioxide removed were indicated by weight measurements after each step. For example, a 1.613 gram sample from the nitriding step weighed 1.43 grams after the carbon was burned off and 1.391 grams after the silicon dioxide was dissolved.

The resulting product, SIALON, was analyzed and found to comprise primarily aluminum oxide dispersed throughout silicon nitride.

EXAMPLE 2

Clay having an aluminum oxide and silicon dioxide content within the desired ranges was intimately mixed with conventional polyurethane foam forming ingredients. The foam provided a source of carbon and also expanded the clay to permit access to the clay by the nitrogen.

Volatile components of the urethane foam were volatilized in a coking step by heating the mixture to a temperature of approximately 800°C thereby leaving a carbon residue in intimate contact with the clay. After this coking step, the resulting carbon-clay mixture was reacted in an enclosed reaction chamber at a temperature between 1200° to 1600°C for a period of about 3 hours. The enclosed reaction chamber enabled a nitrogen atmosphere to be maintained over the reactants.

To provide the desired end product, 185 grams of clay were mixed with 268.53 grams of urethane foam, the foam comprising by weight 25% to 30% carbon after coking, or about 80 grams of carbon.

Any remaining carbon and unreacted silicon dioxide were removed from the product as previously set forth in Example 1. The product was analyzed to be SIALON.

EXAMPLE 3

The steps of Example 2 were repeated with the exception that 10% by weight finely divided aluminum metal was added to the clay by mixing for an hour in a laboratory mill before adding the polyurethane foam to the clay mixture.

Following the coking step the resulting mixture of reactants was reacted by heating in an enclosed reaction chamber at a temperature between 1200°C to 1600°C for three and one-half hours under a nitrogen atmosphere. The nitrogen atmosphere had a flow rate of 6 liters per minute and served to flush carbon monoxide from the chamber. Carbon and silicon dioxide remaining unreacted after the foregoing reaction were removed as has been set forth in Example 1. The product was analyzed to be SIALON.

EXAMPLE 4

Precipitation from solution has shown another technique whereby an intimate combination of silicon and aluminum reactants may be obtained. For example, an aluminum salt was dissolved in water and precipitated from solution by the addition of a basic silicate solution.

In this particular example, 175.4 grams of aluminum sulfate ($Al_2(SO_4)_3 \cdot 16H_2O$) were dissolved in 150 milliliters of water. A separate solution of sodium silicate ($Na_2SiO_3 \cdot 9H_2O$), 170.4 grams, and sodium hydroxide (NaOH), 36 grams, was prepared by dissolution with 50 milliliters of water and poured into the aluminum sulfate solution with vigorous stirring. The resulting reaction is very exothermic and may even cause the solution to boil.

After drying, the precipitate was used as a reactant for the process of this invention by being reacted at about 1300°C in the presence of nitrogen and carbon. Analysis of the resulting product by examination of the x-ray diffraction pattern revealed what was believed to be a solid solution of aluminum oxide in silicon nitride.

The carbon for the reaction may be supplied by dissolving a carbonaceous material such as starch, sugar, etc., in the aluminum sulfate solution or by mixing directly with the precipitate.

A coking step may be interposed before the reacting step, not only to enable recovery of volatilized products but also to reduce the volume of the reactants. For example, coking at about 500°C for several hours has been tried and found suitable.

The precipitate should have a composition within the range of 10% to 65% aluminum oxide and 35% to 90% silicon dioxide, by weight percent and exclusive of any water that may be present, in order to produce a final product having by weight percent of 15% to 70% aluminum oxide and 85% to 30% silicon nitride.

A sample of the material obtained from each of the foregoing examples was pressed and sintered at 1500°C for one hour under an atmosphere of nitrogen. Each SIALON sample produced a suitably sintered refractory material having a very low coefficient of thermal expansion.

The following two examples were performed to demonstrate that the nitriding step may either occur during the reaction step or at the later sintering step.

EXAMPLE 5

Clay, having an aluminum oxide and silicon dioxide content within the range of 40% to 20% aluminum oxide and 46% to 70% silicon dioxide was intimately mixed with charcoal. The clay and charcoal mixture was then reacted by heating in an enclosed chamber at 1400°C under an inert atmosphere of argon gas and for a period of three hours. After the reaction, the remaining unreacted carbon was burned off of the mixture at 700°C in air for a period of two hours. A sample of the resulting powder was pressed into a disc and sintered under a nitrogen atmosphere at a temperature of 1600°C for a period of four hours. The results are tabulated as Example 5 in Table I wherein the composition of the product after each step is given.

EXAMPLE 6

The experiment of Example 5 was repeated with the clay and charcoal mixture; however, the mixture was reacted under a nitrogen atmosphere at 1450°C for a period of three hours. The carbon remaining in the reaction mixture was thereafter burned off in air at 700°C for a period of two hours.

The resulting sample powder was then pressed into a disc and sintered by heating at 1600°C in a nitrogen atmosphere for a period of two hours.

An x-ray diffraction analysis was made of the product after each step of Examples 5 and 6 to determine the composition changes of the product. The results of the comparison between Examples 5 and 6 are summarized in Table I below.

TABLE I

| Sample | COMPOSITION OF SAMPLE | | | | | |
|---|---|---|---|---|---|---|
| | Reaction Step | | Carbon Burn Off Step | | Sintering Step | |
| | | % | | % | | % |
| Ex. 5 | SiC | 45 | SiC | 45 | $Si_3N_4$ | 80 |
| | $Al_2O_3$ | 55 | $Al_2O_3$ | 55 | $Al_2O_3$ | 10 |
| | C(amorphous) | | | | SiC | 5 |
| | | | | | Others | 5 |
| Ex. 6 | $Si_3N_4$ | 45 | $Si_3N_4$ | 45 | $Si_3N_4$ | 60 |
| | $Al_2O_3$ | 45 | $Al_2O_3$ | 45 | $Al_2O_3$ | 40 |
| | Others | 10 | Others | 10 | | |

From the foregoing Table, it is readily apparent that the nitriding step can be combined with the sintering step as shown by the results obtained from Example 5; however, a more complete reaction to silicon nitride and aluminum oxide is obtained by conducting the reaction and sintering steps under a nitrogen atmosphere.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of producing a refractory material consisting essentially of a solid solution of aluminum oxide in silicon nitride, the composition by weight percent being 15% to 70% aluminum oxide and 85% to 30% silicon nitride, the method comprising the steps of:

obtaining silicon dioxide and aluminum oxide reactants selected from the group consisting of:

clay having a composition by weight percent of 40% to 20% aluminum oxide and 46% to 70% silicon dioxide;

a coked mixture of rice hulls and an aluminum source, the aluminum source being selected from the group consisting of clays formed by the geologic decomposition of aluminum compounds, oxides and salts of aluminum and aluminum metal, the concentration of aluminum not exceeding 20% by weight; and a precipitate having a composition by weight percent of 10% to 65% aluminum oxide and 35% to 90% silicon dioxide; placing the reactants in an enclosure; and heating the reactants to a temperature within the range on the order of about 1200°C to 1600°C in the presence of carbon and nitrogen until a solid solution of aluminum oxide in silicon nitride is produced.

2. A method as defined in claim 1 wherein said obtaining step is further defined by dispersing carbon in said reactants.

3. A method as defined in claim 1 wherein said heating step further comprises flushing gaseous by-products of the reaction from the enclosure with excess quantities of nitrogen gas.

4. A method of producing a sintered refractory product having a predetermined shape, the refractory material consisting essentially of a solid solution of aluminum oxide in silicon nitride, the composition by weight percent being 15% to 70% aluminum oxide and 85% to 30% silicon nitride, the method comprising the steps of:
  obtaining silicon dioxide and aluminum oxide reactants selected from the group consisting of:
    clay having a composition by weight percent of 40% to 20% aluminum oxide and 46% to 70% silicon dioxide;
    a coked mixture of rice hulls and an aluminum source, the aluminum source being selected from the group consisting of clays formed by the geologic decomposition of aluminum compounds, oxides and salts of aluminum and aluminum metal, the concentration of the aluminum not exceeding 20% by weight; and
    a precipitate having a composition by weight percent of 10% to 65% aluminum oxide and 35% to 90% silicon dioxide;
  placing the reactants in a chamber;
  heating the reactants to a temperature within the range on the order of about 1200°C to 1600°C in the presence of carbon until aluminum oxide and silicon carbide are produced;
  molding the aluminum oxide and silicon carbide into the predetermined shape; and
  sintering the molded shape at a temperature within the range on the order of about 1300°C to 1900°C and in the presence of nitrogen until a solid solution of aluminum oxide in silicon nitride is produced.

* * * * *